United States Patent
Ferris et al.

(10) Patent No.: US 8,656,384 B2
(45) Date of Patent: Feb. 18, 2014

(54) STANDARDIZED SOFTWARE APPLICATION CONFIGURATION

(75) Inventors: James M. Ferris, Cary, NC (US); David P. Huff, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1472 days.

(21) Appl. No.: 11/767,230

(22) Filed: Jun. 22, 2007

(65) Prior Publication Data

US 2008/0320468 A1 Dec. 25, 2008

(51) Int. Cl.
*G06F 9/445* (2006.01)

(52) U.S. Cl.
USPC .......................................................... 717/174

(58) Field of Classification Search
USPC ................................................. 717/174–178
See application file for complete search history.

(56) References Cited

U.S. PATENT DOCUMENTS

| | | | |
|---|---|---|---|
| 5,450,545 A | 9/1995 | Martin et al. | |
| 5,555,416 A * | 9/1996 | Owens et al. | 717/178 |
| 6,161,176 A * | 12/2000 | Hunter et al. | 713/1 |
| 6,239,800 B1 | 5/2001 | Mayhew et al. | |
| 6,282,711 B1 * | 8/2001 | Halpern et al. | 717/175 |
| 6,718,366 B2 | 4/2004 | Beck et al. | |
| 6,744,450 B1 | 6/2004 | Zimniewicz et al. | |
| 6,910,072 B2 | 6/2005 | Beck et al. | |
| 6,973,647 B2 * | 12/2005 | Crudele et al. | 717/177 |
| 7,594,225 B2 | 9/2009 | Barr et al. | |
| 7,805,676 B2 | 9/2010 | Schemers et al. | |
| 2003/0043178 A1 | 3/2003 | Gusler et al. | |
| 2003/0088616 A1 | 5/2003 | Etessami et al. | |
| 2004/0083206 A1 | 4/2004 | Wu et al. | |
| 2004/0250247 A1 | 12/2004 | Deeths et al. | |
| 2005/0108703 A1 * | 5/2005 | Hellier | 717/174 |
| 2005/0125788 A1 | 6/2005 | Lupini et al. | |
| 2005/0262501 A1 * | 11/2005 | Marinelli et al. | 717/174 |
| 2006/0010345 A1 | 1/2006 | Schnoebelen et al. | |
| 2006/0039547 A1 | 2/2006 | Klein et al. | |
| 2006/0123409 A1 * | 6/2006 | Jordan et al. | 717/174 |
| 2006/0123410 A1 * | 6/2006 | Kapoor | 717/174 |
| 2006/0253849 A1 * | 11/2006 | Avram et al. | 717/172 |
| 2007/0106984 A1 | 5/2007 | Birk Olsen et al. | |
| 2007/0271552 A1 | 11/2007 | Pulley | |
| 2008/0127171 A1 * | 5/2008 | Tarassov | 717/174 |
| 2008/0127175 A1 * | 5/2008 | Naranjo et al. | 717/174 |
| 2008/0155534 A1 | 6/2008 | Boss et al. | |
| 2008/0307413 A1 | 12/2008 | Ferris | |
| 2009/0064131 A1 | 3/2009 | Ferris | |
| 2009/0144700 A1 | 6/2009 | Huff | |

OTHER PUBLICATIONS

Non-Final Office Action for U.S. Appl. No. 11/947,074, mailed Mar. 30, 2011.

(Continued)

*Primary Examiner* — Anna Deng

(74) *Attorney, Agent, or Firm* — Lowenstein Sandler LLP

(57) ABSTRACT

A system and method of providing a user with a post installation configuration file include providing a user with a list of software applications that are available for installation. At least one software application selection from the list of applications is received by the system. At least one post installation configuration script associated with the use selected software application is retrieved, the at least one post installation configuration script using a common user interface for a plurality of software application from the list of software applications. The at least one post installation configuration script associated with the use selected software application and the at least one user selected software application are packaged into a user package.

15 Claims, 4 Drawing Sheets

(56) References Cited

OTHER PUBLICATIONS

Non-Final Office Action for U.S. Appl. No. 11/947,074, mailed Sep. 28, 2011.
Final Office Action for U.S. Appl. No. 11/947,074, mailed Apr. 23, 2012.
Advisory Action for U.S. Appl. No. 11/760,952, mailed Jan. 5, 2012.
Non-Final Office Action for U.S. Appl. No. 11/760,952, mailed Mar. 31, 2011.
Final Office Action for U.S. Appl. No. 11/760,952, mailed Oct. 26, 2011.
Non-Final Office Action for U.S. Appl. No. 11/760,952, mailed Feb. 23, 2012.
Advisory Action for U.S. Appl. No. 11/848,815, mailed Jan. 11, 2012.
Non-Final Office Action for U.S. Appl. No. 11/848,815, mailed Apr. 20, 2011.
Final Office Action for U.S. Appl. No. 11/848,815, mailed Oct. 14, 2011.
Non-Final Office Action for U.S. Appl. No. 11/848,815, mailed Apr. 23, 2012.

* cited by examiner

STANDARDIZED SOFTWARE APPLICATION CONFIGURATION

FIELD

The embodiments relate to methods and systems for application installation and configuration. More particularly, the embodiments relate to methods and systems that automate installation and configuration for a plurality of applications.

BACKGROUND

Today, computers and computer applications are a critical tool in society. Although most computers come pre-configured with some computer applications, most users must install and configure additional computer applications on their computer to tailor their computer for their particular needs. Such computer application installation and configuration can be as easy as a one step activation of an installation program. However, more complex computer applications require a user to provide installation decisions and configuration decisions to complete installation of the computer application. Such installation decisions and configuration decisions are not always easy to make. Some installation decisions and configuration decisions require knowledge of an installation parameter and a configuration parameter, e.g., parameters of a user's computer hardware, operating system parameters, other computer programs installed on the user's computer, etc. Without a user making the proper installation decision and configuration decision, an installed computer application may not execute at all or may not execute in the manner desired by the user.

An example of a software application that requires user input during installation and configuration is the ZIMBRA™ Collaboration Suite. Before the Installation of ZIMBRA™ even begins, ZIMBRA™ specifies that the disk partition be set as follows: The Mount Point/RAID Volume size for the /boot partition should be 100 MB, the Swap partition should be set to twice the size of the RAM on your machine, and the Root partition (/) should be set with the remaining disk space size. Such pre-installation configuration of disk partition can be performed within an operating system (OS), e.g., RED HAT, setup.

Moreover, the ZIMBRA™ installation verifies that the correct prerequisite packages are installed, e.g., MYSQL, the FEDORA™, Core 4 operating system, etc. If the correct prerequisite packages are installed, the installation process installs the ZIMBRA™ Collaboration Suite on a server. Otherwise, the installation of the ZIMBRA™ Collaboration Suite process ends to allow the use to enter the correct prerequisite packages.

ZIMBRA™ requires a user to manually configure the hostname in the OS with the fully qualified hosthame of the ZIMBRA™ server, e.g., mailhost.example.com. A user must further configure the OS with the Network Gateway and Primary Domain Name Server (DNS) addresses. A user must further turn off their firewall, disable the Security Enhanced Linux (SELinux), and disable SENDMAIL in order to run the ZIMBRA™ Collaboration Suite.

The ZIMBRA™ Collaboration Suite runs on the FEDORA™, Core 4 operating system. When installing the FEDORA™ software for the ZIMBRA™ Collaboration Suite, a user is instructed to accept the default setup answers, except for the following steps: The Mount Point/RAID Volume size for the /boot partition should be 100 MB, the Swap partition should be set to twice the size of the RAM on your machine, and the Root partition (/) should be set with the remaining disk space size. The Hostname must be manually configured with the hostname name [mailhost.example.com] of the ZIMBRA™ server. A user must manually configure the Gateway and Primary DNS addresses in FEDORA™. A user must turn off their firewall and disable the Security Enhanced Linux (SELinux). A user must disable SENDMAIL in order to run FEDORA™.

The installation process checks to see if SENDMAIL, Postfix, and MYSQL software are running. If any of these software applications are running, a user is asked to disable them. Disabling MYSQL is optional but highly recommended. SENDMAIL and Postfix must be disabled for the ZIMBRA™ collaboration Suite to start correctly. Next, the installer checks to see that the prerequisite software is installed. If NPTL, sudo, libidn, cURL, fetchmail, GMP or compat-libstdc++− are not installed, the install process quits. Accordingly, a user must fix the problem and restart the installation.

Because of the complexity in installing desired software application, i.e., determining what prerequisite software applications are required for a desired software application and the amount of effort required downloading each prerequisite software application individually, Red Hat Packet Manager ("RPM") packages were developed to simplify application installation. A RPM package can contain MYSQL™, the FEDORA™, Core 4 operating system, NPTL, sudo, libidn, cURL, fetchmail, GMP or compat-libstdc++−, etc. Thus, RPM packages greatly simplify the installation of a software application.

However, even using a RPM package to install their desired software application a user typically perform post-install tasks or configuration to ensure interpretability between the installed software and existing software. Post installation configuration can consist of similar tasks across many applications, such as starting and stopping services, editing configuration files, prompting a user for specific information to that user's environment, prompting a user for database username and password, creating new database users and access control, creating new databases and populating them with default data, as well as other tasks.

There are several different ways for performing these post installation configurations and each software application developer establishes their own way of performing them. As a result, the user can be required to take additional time to learn all the post-install configuration tasks for many software applications, which can become burdensome.

Accordingly, the embodiments of the present teachings solve these and other problems of the prior art associated with differing configurations for software applications

BRIEF DESCRIPTION OF THE DRAWINGS

The accompanying drawings, which are incorporated in and constitute a part of this specification, illustrate embodiments of the teachings and together with the description, serve to explain the principles of the teachings.

DESCRIPTION OF THE EMBODIMENTS

Figure 1:
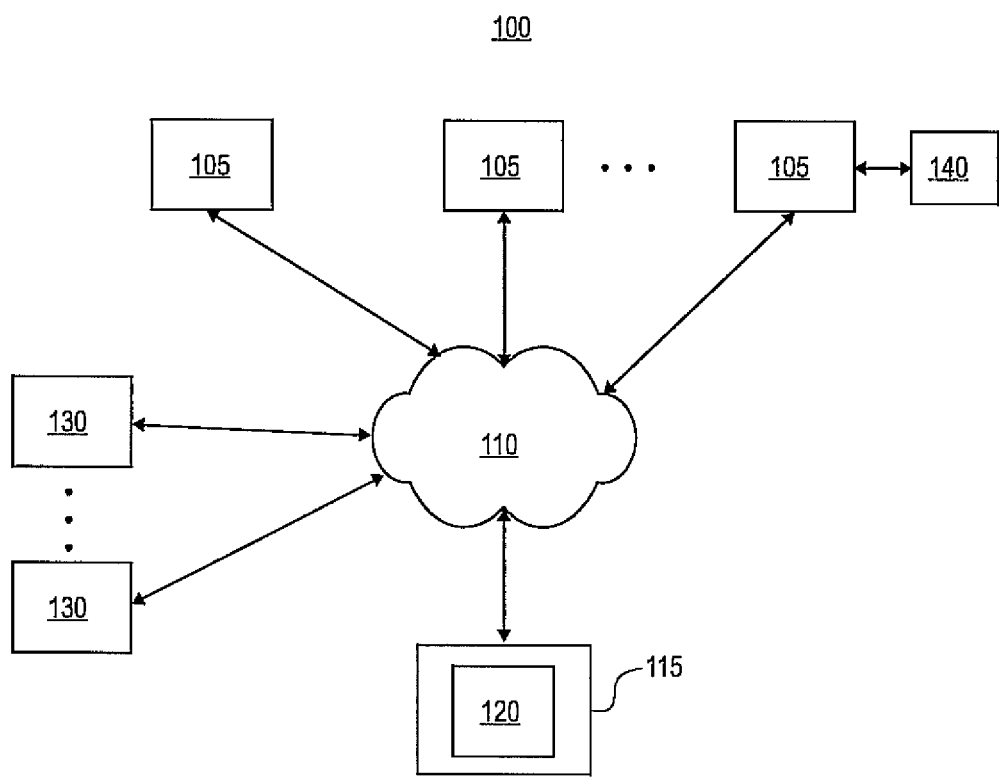
FIG. 1 shows a system that allows a user to communicate with a portal server, in accordance with an embodiment of the present teachings.

For simplicity and illustrative purposes, the principles of the present teachings are described by referring mainly to exemplary embodiments thereof. However, one of ordinary skill in the art would readily recognize that the same principles are equally applicable to, and can be implemented in, all types of networked computer systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings provide "standardized" post installation configuration of a software application. A portal service can be configured to create a novel Red Hat Packet Manager ("RPM") package that includes the selected software to be installed on a user's computing device and a software post install configuration file ("SPIC-F"). The SPIC-F can be executed to provide a custom tailored installation script based on the configuration of the system of the user. In some embodiments, the SPIC-F can include any number of configuration scripts that are executed at the appropriate instance.

A user can interact with the portal service through a web browser or other similar graphical user interface (GUI). The portal service can generate a selection GUI that allows a user to select desired software applications. The portal service can then retrieve the appropriate configuration scripts based on the user selected software application(s) to be placed in the SPIC-F. The portal service can then package the user selected software application(s) along with any associated configuration script(s) into a system-specific RPM package. After software application installation on a user's computing device, the SPIC-F can then be read and executed to perform the various post-installation configuration tasks for the associated software application.

The SPIC-F provides a standard protocol for describing the post install configuration tasks required by a software application. The standard provides an open, extensible mechanism for different applications to specify their post installation configurations. The SPIC-F describes the information necessary to operate the software application, information provided by the user and how to process the user information. The SPIC-F can be specific for each application. Because the SPIC-F files can be distributed from a central location, i.e., a portal server, a user can be provided with a standardized, post-installation configuration graphical user interface (GUI) or text user interface (TUI) that is not independent software vendor (ISV) dependent.

A post-install configuration ("PIC") tool at a client provides a standardized, user interface for configuring a software application after it has been installed. The PIC tool can parse information in the SPIC-F and prompt a user for configuration information. The user provided information is used to perform the post install configuration. The PIC tool can be initiated once the SPIC-F is placed in a predefined location. The PIC tool can have both a GUI and text user interface (TUI) depending upon a user's run level. The PIC tool can be a standalone application that runs either in a cron or as a background service, e.g., in a tool bar. The PIC tool can query a remote server or service for additional information and can be accessed remotely.

An independent software vendor ("ISV") can provide the parameters for the SPIC-F to be placed on the portal service. The ISV can use a web browser or other similar graphical user interface (GUI) to interact with the portal service. The ISV can use a developer tool that has knowledge of what software applications exist on the portal service, what services those software applications provide and how to package them into a SPIC-F. The developer tool can assist an ISV in developing a SPIC-F for their software application.

Reference will now be made in detail to the present embodiments, examples of which are illustrated in the accompanying drawings. Wherever possible, the same reference numbers will be used throughout the drawings to refer to the same or like parts.

FIG. 1 shows a system 100 that allows a user to communicate with a portal server, in accordance with an embodiment of the present invention. It should be readily apparent to those of ordinary skill in the art that the system 100 shown in FIG. 1 represents a generalized system illustration and that other components can be added or existing components can be removed or modified while still remaining within the spirit and scope of the present teachings. As shown in FIG. 1, the system 100 includes users 105, a network 110, a portal server 115, and ISVs 130. These components of FIG. 1 will now be briefly described.

The users 105 can be an individual user, a small business owner, a user within a business or governmental entity, etc. The users 105 can interact with the portal server 115 using computing platforms such as laptops, personal computers, workstations, servers, or other similar devices.

The users 105 can interface with the portal server 115 through the network 110 via a network connection (not shown). Users 105 can access the portal server 115 to retrieve software application(s) that they desire to install on their computing device. A user 105 can access the portal server 115 via known Internet communication protocols, e.g., Transmission Control Protocol/Internet Protocol (TCP/IP), using known Internet addressing schemes. The network connection can be a private network (e.g., a business network, an educational network, etc.), an Internet service provider or other similar interfaces means. The network 110 can be a combination of local, wide area networks as well as private or public networks or combinations thereof. In some embodiments, the Internet can be used as the network 110.

A user 105 computing device can also include a PIC tool 140 that can provide common interface with other software application configurations. The PIC tool 140 can configure a software application after it has been installed. The PIC tool 140 can parse the information in the SPIC-F and prompt a user 105 for information. The information provided by the user 105 can be used to perform the post install configuration. The PIC tool 140 can be initiated once the SPIC-F is placed in a predefined location on the user 105 computing device. The PIC tool 140 can have both a GUI and text user interface (TUI) depending upon a user's run level. The PIC tool 140 can be a standalone application. The PIC tool 140 can be used instead of a configuration GUI or TUI provided by an ISV 130. Because the SPIC-F is distributed from a central location, i.e., portal server 115, the user 105 can be provided with a standardized, post-installation configuration GUI or TUI that is not ISV 130 dependent.

The portal server 115 can be implemented with a variety of servers from manufacturers such as DELL, HEWLETT-PACKARD, TRANSMETA, SUN MICROSYSTEMS, etc. as known to those skilled in the art. The portal server 115 can store and execute a multi-user operating system such as RED HAT Linux 5.xx, WINDOWS Enterprise, UNIX-HP, or other operating systems known to those skilled in the art. Similar to the users 105, the portal server 115 can interface with the network 110 via a network interface such as private network, a T1 connection or other similar high throughput network interface.

The portal server 115 can store a plurality of software applications that a user 105 can install on their computing device. The portal server 115 can store SPIC-F(s) that can be transferred to a user 105 along with a software application to ease configuration of the software application. The portal server can include an installation and configuration assistant ("ICA") module 120 that will assist a user in selecting a software application, and automate distribution of the software application and SPIC-F to the user 105 (as described in more detail below).

The portal server 115 can include ICA module 120. The user 105 can access the ICA module 120 to obtain desired software application(s) and a SPIC-F(s).

The ICA module 120 can be configured to provide a user 105 with a list of software applications that are available on the portal server 115 for a user to select for installation. The ICA module 120 can also be configured to package a RPM package that includes the user 105 selected software application(s) and the SPIC-F(s) to assist in configuration of the selected software. For example, the SPIC-F can be an extensible markup language (XML) file or similar language that can describe what the software application requires to direct execution of a processor. The SPIC-F file can describe what is prompted to a user 105, buffering any user supplied information and the processing the user 105 supplied information. The SPIC-F file can also be specific for each software application.

The ICA module 120 can be further configured to query a user 105 to input the parameters of the computer system of the user 105, i.e., a computing environment. For example, the ICA module 120 can generate a configuration GUI that allows a user to input parameters such as operation system type and version, central processing unit, amount of memory, installed applications, number of disk drives, number of users, security requirements, etc. The ICA module 120 can then use the user 105 inputted parameters to generate the configuration assistant executable.

The ISVs 130 can be configured to interface with the portal server 115 through the network 110 via a network connection (not shown). The network connection can be a private network (e.g., a business network, an educational network, etc.), an Internet service provider or other similar interfaces means. The network 110 can be a combination of local, wide area networks as well as private or public networks or combinations thereof. In some embodiments, the Internet can be used as the network 110.

The ISVs 130 can provide the parameters for the SPIC-F to be placed on the portal server 115. The ISVs 130 can use a web browser or other similar graphical user interface (GUI) widget to interact with the portal server 115. An ISV 130 can use a developer tool to create the SPIC-F. The developer tool can have knowledge of what other software applications that exist on the portal service, what services those software applications provide and how to package them into the SPIC-F. The developer tool will assist an ISV 130 in developing a SPIC-F for their software application.

Figure 2:
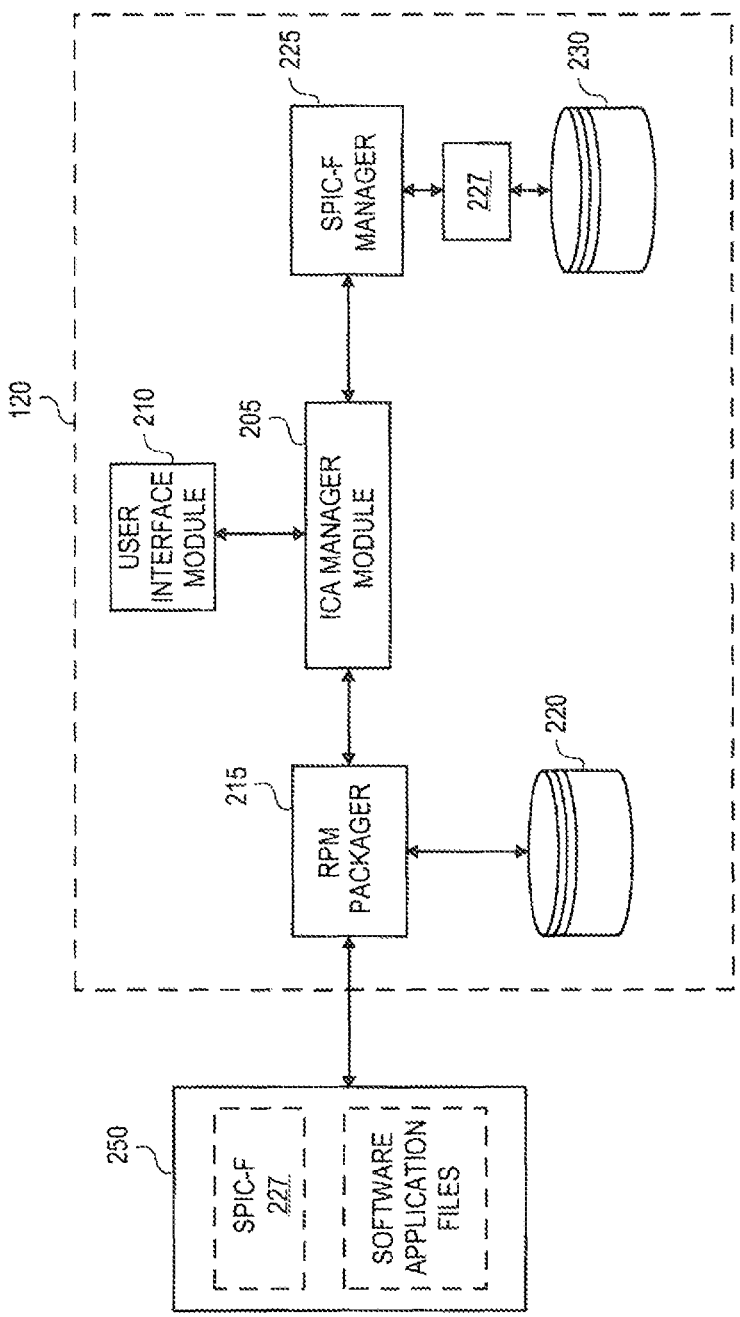
FIG. 2 shows is a more detailed block diagram of the installation and configuration assistant module from FIG. 1, in accordance with another embodiment of the present teachings.

FIG. 2 shows a more detailed block diagram of the ICA module 120 from FIG. 1, in accordance with another embodiment of the present teachings. It should be readily apparent to those of ordinary skill in the art that the ICA module 120 shown in FIG. 2 represents a generalized system illustration and that other components can be added or existing components can be removed or modified while still remaining within the spirit and scope of the present teachings.

As shown in FIG. 2, the ICA module 120 can comprise an ICA manager module 205, a user interface module 210, a RPM packager 215, a RPM package database 220, a SPIC-F manager 225 and a SPIC-F database 230. These components of ICA module 120 will now be further described.

The ICA manager module 205 can be configured to manage modules 210-230 to coordinate the internal functionality of the ICA module 120. In some contexts, the ICA manager module 205 can be considered the main thread or routine that manages the data flow and processing sequences of data flowing throughout the ICA module 120.

The ICA manager module 205 can interface with the user interface module 210. The user interface module 210 can be configured to generate GUIs to retrieve information from a user 105 as well as provide the user 105 a mechanism for receiving information. The GUIs of the user interface module 210 can be written in, e.g., HTML, XML, Java, etc., as is known to those skilled in the art.

The user interface module 210, in some embodiments, can provide a selection GUI, which displays a list of available software applications (or applets) that are stored in the RPM package database 220. The selection GUI can include multiple checkboxes, each checkbox associated with a software application. A user 105 can mark the checkbox to indicate a selected software application. Alternately, the selection GUI can provide a user 105 with a drop down menu of a list of software applications that are stored in the RPM package database 220. The selection GUI can also include a GUI widget (e.g., a "Finish" button) to indicate to the ICA manager module 205 that the user 105 has completed the selection process. The user interface module 210 can pass the user 105's software application selections to the ICA manager 205 for temporary storage.

The RPM packager 215 can be configured to accept the selections of software application(s) from the user interface module 210 through the ICA manager module 205. The RPM packager 215 can retrieve the selected applications from the RPM database 220.

The RPM packager 215 can also be configured to receive a SPIC-F 227 from the SPIC-F manager 225 and package the selected applications and the SPIC-F 227 as an RPM package 225.

The SPIC-F manager module 225 can retrieve the SPIC-F(s) 227 from the SPIC-F database module 230. More particularly, the user 105 software application selection(s) can be passed to the SPIC-F retrieve module 225 from the ICA manager 205. The SPIC-F retrieve module 225 can formulate a database query with the user 105 software application selection(s). The SPIC-F manager module 225 can issue the formulated database query to the SPIC-F database module 230. The SPIC-F database module 230 can pass a SPIC-F(s) 227 that corresponds to the formulated database query back to the SPIC-F manager 225. The SPIC-F retrieve module 225 can then pass the SPIC-F(s) 227 to the SPIC-F manager module 225.

In some embodiments, the RPM package database module 220 can also store prerequisite software application(s) that may be required by the selected software application(s). Thus, the RPM packager 215 can automatically retrieve prerequisite software application(s) and package an RPM package 250 that not only conventionally includes software application files, but additionally includes prerequisite software application(s) and the SPIC-F(s) 227 retrieved from the SPIC-F database 230. For example, a user selecting the ZIMBRA™ Collaboration Suite can automatically receive the MYSQL software application and SPIC-F(s) 227 associated with the ZIMBRA™ Collaboration Suite and the MYSQL software application.

Once the system-specific RPM package 250 is packaged, the ICA manager module 205 can direct the user interface module 210 to generate a results GUI that provides a link for the user 105 to download the system-specific RPM package 250 to a user 105 as a single file. Alternately, the RPM package 250 can be a separate file from the SPIC-F(s) 227 that a user 105 can download individually, and then executed individually to perform their respective installation and configuration.

The SPIC-F database module 230 can be populated by the ISVs 130 using a web browser or other similar graphical user interface (GUI) widget to interact with the portal server 115. The ISVs 130 can interact with the user interface module 210 to establish a desire to populate the SPIC-F database module 230. Their desire can be conveyed through an ISV GUI provided by the user interface module 210. The ISV GUI can provide a menu selection to allow the ISVs 130 to pass their created SPIC-F(s) 227 to the SPIC-F database module 230. The user interface module 210 can receive the ISV 130 SPIC-F(s) 227 and transfer the SPIC-F(s) 227 to the ICA manager 205. The ICA manager 205 can transfer the ISV 130 SPIC-F 227 to the SPIC-F manager 225 which can store the ISV 130 SPIC-F(s) 227 on the SPIC-F database 230.

An ISV 130 can use a developer tool to create the SPIC-F 227 that populates the SPIC-F database 230. The developer tool can have knowledge of what other software applications that exist on the portal service, what services those software applications provide and how to package them into a SPIC-F. The developer tool will assist an ISV 130 in developing a SPIC-F 227 or their software application.

Figure 3:
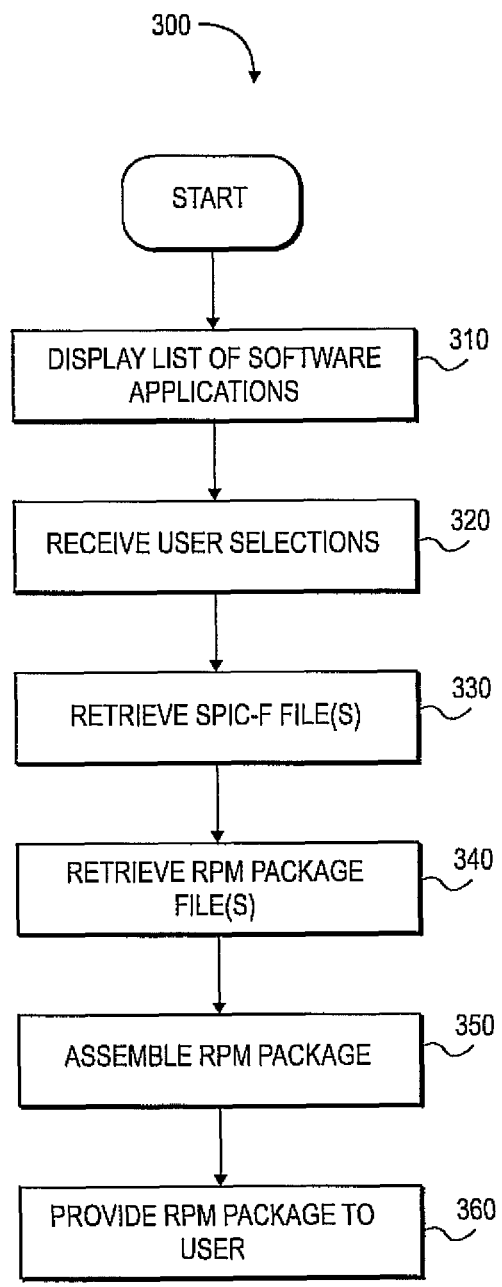
FIG. 3 shows a flow diagram for the steps that can be performed by the installation and configuration assistant, in accordance with another embodiment of the present teachings.

FIG. 3 shows a flow diagram 300 that can be performed by the ICA module 120, in accordance with another embodiment of the present teachings. It should be readily apparent to those of ordinary skill in the art that the flow diagram 300 shown in FIG. 3 represents a generalized flow diagram illustration and that other steps can be added or existing steps can be removed or modified while still remaining within the spirit and scope of the present teachings.

In step 310, the ICA manager module 205 can direct the user interface module 210 to generate a selection GUI (previously described) that displays to a user 105 a list of available software applications that can be downloaded. More particularly, a user 105 can access the ICA module 120 executing on the portal server 115. In some embodiments, the user 105 may authenticate to the portal server 115 to gain access. Once the user 105 has been authenticated, the ICA manager module 205 can invoke the user interface module 210 to display the selection GUI for the user 105. The selection GUI can provide a list of software applications that a user 105 may desire to install on the user 105's computing device, which can be viewed through a web browser such as, e.g., Firefox, Internet Explorer, Opera, etc. Alternately, within the spirit and scope of the teachings the GUI can provide a list of software applications that a user 105 desires to install through a custom written software application that is programmed with a list of software application that are available to a user 105 for download.

In step 320, the ICA manager module 205 can be configured to receive the information regarding the selected software application(s). More particularly, the user 105 may have completed selection of software application(s) and invoked a GUI widget such as a button which indicates the user 105 has completed the selection process. The user interface module 210 receives the click of the GUI widget, the user interface module 210 can be configured to extract the selected software application(s) and forward the selection to the ICA manager module 205. The ICA manager module 205 can be configured to temporarily buffer the selections.

After the buffering of the user 105 software application selection(s) in the ICA manager module 205, the ICA manager module 205 in step 330 can direct the SPIC-F manager 225 to retrieve the appropriate SPIC-F(s) 227 from the SPIC-F database 230. After the buffering of the user 105 selections in the ICA manager module 205, the ICA manager module 205 can direct the SPIC-F manager module 225 to retrieve the appropriate SPIC-F(s) 227 from the SPIC-F database 230. In particular, the ICA manager module 205 can pass the user 105 selected software application(s) to the SPIC-F manager module 225. The ICA manager module 225 can formulate a database query based on the user 105 selected software application(s). The database query is issued to the SPIC-F database module 230, with the SPIC-F database module 230 returning a SPIC-F(s) 227 that corresponds to the user 105 selection(s). The SPIC-F(s) 227 is passed from the SPIC-F manager module 225 to the ICA manager 205.

The user 105 software application selection(s) can be used in step 340 to retrieve either preconfigured RPM packages or individual files needed to create an RPM package 250 that includes the SPIC-F(s) 227. In particular, the ICA manager 205 can pass the user 105 software application selection(s) to the RPM packager 215. The ICA manager module 225 can formulate a database query based on the user 105 selected software application(s). The database query is issued to the RPM packager module 215, with the RPM package database 220 returning a RPM file(s), either preconfigured RPM package files or individual files required to formulate an RPM package 250 that corresponds to the user 105 selection(s). The RPM file(s) are buffered by the RPM packager module 215.

In step 350, the RPM packager 215 can be configured to package the software application(s) and SPIC-F 227 into a RPM package 250. In particular, the ICA manager module 205 can pass the buffered SPIC-F file to the RPM packager 215. The RPM packager 215 can place both the SPIC-F 227 received from the ICA manager module 205 and the RPM file(s) retrieved from the RPM package database 220 into a RPM package 250.

The ICA manager module 205 can invoke the user interface module 210 to generate an output GUI that can provide the RPM package 250 formulated in step 350 to a user 105 for download, in step 360. In particular, RPM packager 215 can pass the RPM package 250 to the ICA manager module 205 after assembly. The ICA manager module 205 can direct the user interface module 210 to present the RPM package 250 to the user 105 through an output GUI. The user 105 can then choose to download the RPM package 250 at their convenience.

The various modules disclosed herein can be implemented in hardware, in software, or a combination of hardware and software. Implementation in hardware or a combination of hardware and software would have the various modules communicating with over a data interface, e.g., a universal serial bus, a Peripheral Component Interconnect ("PCI") interface, a Firewire interface, etc.

Moreover, although ICA module 120 is shown to reside on portal server 115, the ICA module 120 can be located at any location that a user 105 can access the ICA module 120 to retrieve the RPM package 250. For example, the ICA module 120 can reside on an Intranet, a compact disc, a digital video disc, a flash drive, an external hard drive, etc.

Figure 4:
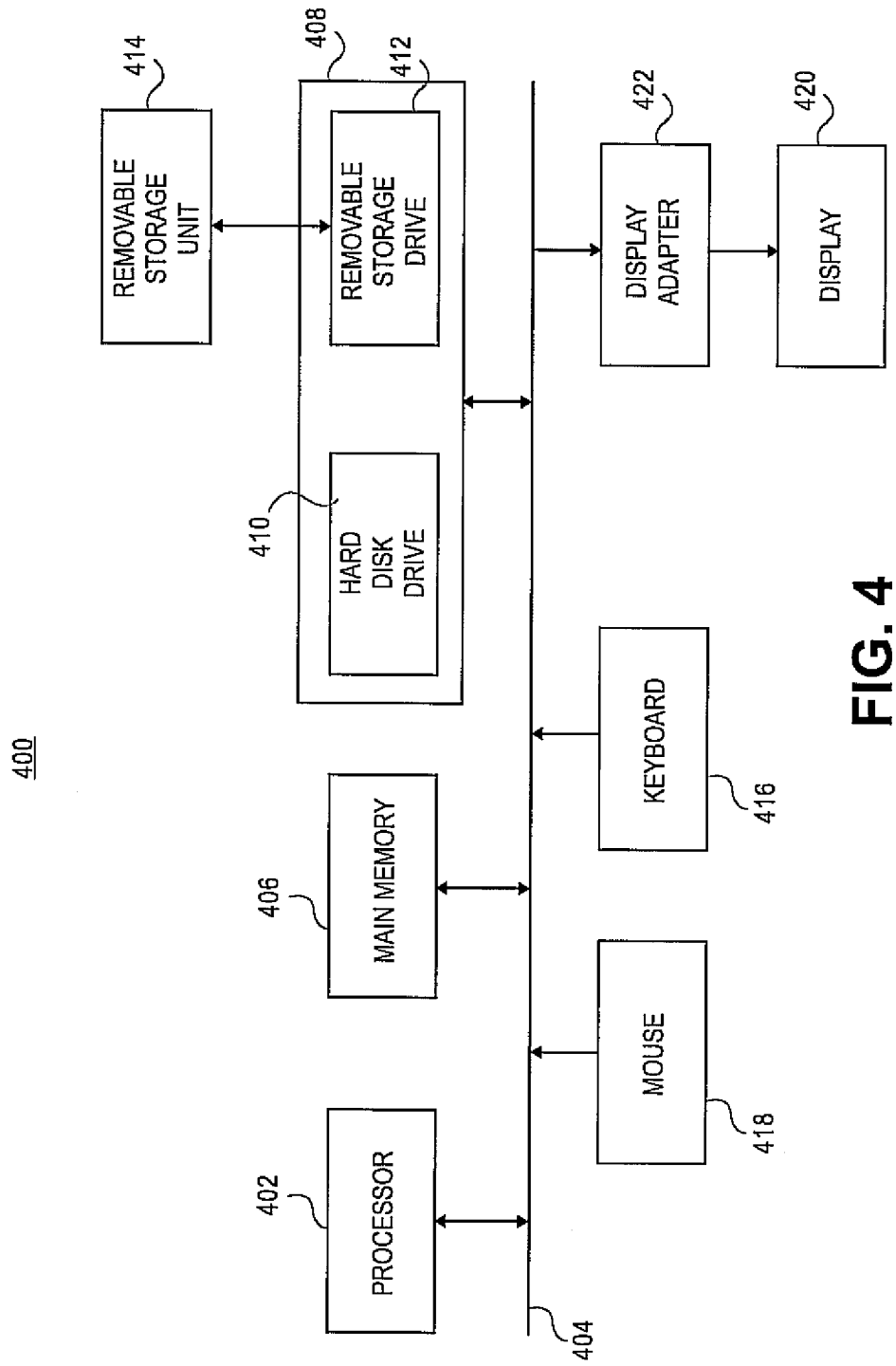
FIG. 4 shows a computer system that can be used with the installation and configuration assistant, in accordance with another embodiment of the present teachings.

FIG. 4 shows a computer system that can be used with the ICA module 120, in accordance with another embodiment of the present teachings.

As shown in FIG. 4, the computer system 400 includes one or more processors, such as processor 402 that provide an execution platform for embodiments of the ICA module 120. Commands and data from the processor 402 are communicated over a communication bus 404. The computer system 400 also includes a main memory 406, such as a Random Access Memory (RAM), where the ICA module 120 may be executed during runtime, and a secondary memory 408. The secondary memory 408 can include, for example, a hard disk drive 410 and/or a removable storage drive 412, representing a floppy diskette drive, a magnetic tape drive, a compact disk drive, etc., where a copy of a computer program embodiment for the ICA module 120 may be stored. The removable storage drive 412 can read from and/or writes to a removable storage unit 414 in a well-known manner. A user interfaces with the security client and certificate management system with a keyboard 416, a mouse 418, and a display 420. A display adapter 422 interfaces with the communication bus 404 and the display 420. The display adapter also receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been illustrated with respect to one or more implementations, alterations and/or modifications can be made to the illustrated examples without departing from the spirit and scope of the appended claims. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. It is intended that the specification and examples be considered as exemplary only, with a true scope and spirit of the teachings being indicated by the following claims.

What is claimed is:

1. A method, comprising:
   receiving, through a web interface, a selection of a software application from a list of installable software applications provided to a user;
   receiving a parameter of a computer system on which the selected software application is to be installed;
   determining a prerequisite software application associated with the selected software application;
   receiving post installation configuration scripts for the selected software application from an independent software vendor via a developer tool configured to assist the independent software vendor in developing the post installation configuration scripts; and
   packaging the post installation configuration scripts, the selected software application, and the prerequisite software application into a user package, wherein the user package is generated based on the received parameter.

2. The method according to claim 1, wherein the user package is an RPM package.

3. The method according to claim 1, further comprising automatically obtaining the prerequisite software application associated with the selected software application.

4. The method according to claim 1, further comprising providing the user an option to download the user package from a remote server via the web interface.

5. The method according to claim 1, further comprising providing the user an option to obtain the user package from a compact disc.

6. The method according to claim 1, further comprising providing the user an option to obtain the user package from a flash drive.

7. The method according to claim 1, wherein at least one of the post installation configuration scripts is an XML script.

8. The method according to claim 1, further comprising:
   buffering the received parameters of the computer system, wherein the received parameters include security requirements; and
   wherein the prerequisite software application is a database application.

9. A system, comprising:
   a memory comprising instructions;
   a processor, connected to the memory, the processor configured to execute the instructions, wherein the instructions cause the processor to:
   receive, through a web interface, a selection of a software application selection from a list of installable software applications provided to a user,
   receive a parameter of a computer system on which the selected software application is to be installed;
   determine a prerequisite software application associated with the selected software application;
   retrieve post installation configuration scripts for the selected software application from an independent software vendor via a developer tool configured to assist the independent software vendor in developing the post installation configuration scripts, and package the post installation configuration scripts, the selected software application, and the prerequisite software application into a user package based on the received parameter.

10. The system according to claim 9, wherein the processor is further configured to automatically obtain the prerequisite software application associated with the selected software application.

11. The system according to claim 9, wherein the processor is further configured to allow the user to download a single package from a remote server via the web interface.

12. The system according to claim 9, wherein the processor is further configured to allow the user to obtain a single package from a compact disc.

13. The system according to claim 9, wherein the processor is further configured to allow the user to obtain a single package from a flash drive.

14. The system according to claim 9, wherein at least one of the post installation configuration scripts is an XML script.

15. The system according to claim 10, wherein the user package is an RPM package.

* * * * *